United States Patent [19]
Maltsev

[11] Patent Number: 6,039,252
[45] Date of Patent: Mar. 21, 2000

[54] BAR CODE READING SYSTEM FOR RECONSTRUCTING IRREGULARLY DAMAGED BAR CODES

[75] Inventor: Pavel A. Maltsev, Edmonds, Wash.

[73] Assignee: Intermec Corporation, Everett, Wash.

[21] Appl. No.: 08/572,514

[22] Filed: Dec. 14, 1995

[51] Int. Cl.[7] .................................................. G06K 7/10
[52] U.S. Cl. .......................................... 235/462; 235/472
[58] Field of Search .................................... 235/472, 456, 235/436, 462, 463, 467, 454, 494, 487, 383; 371/37.1

[56] References Cited

U.S. PATENT DOCUMENTS

| | | | |
|---|---|---|---|
| 5,241,164 | 8/1993 | Pavlidis et al. | 235/462 |
| 5,276,316 | 1/1994 | Blanford | 235/462 |
| 5,278,398 | 1/1994 | Pavlidis et al. | 235/462 |
| 5,319,181 | 6/1994 | Shellhammer et al. | 235/462 |
| 5,457,308 | 10/1995 | Spitz et al. | 235/462 |
| 5,489,767 | 2/1996 | Billington | 235/437 |
| 5,550,365 | 8/1996 | Klancnik et al. | 235/462 |
| 5,552,588 | 9/1996 | Schneider | 235/483 |
| 5,553,084 | 9/1996 | Ackley et al. | 235/437 |

*Primary Examiner*—Thien Minh Le
*Attorney, Agent, or Firm*—Graham & James LLP

[57] ABSTRACT

A bar code reading system capable of reconstructing irregularly damaged bar codes includes an input device such as an omnidirectional or CCD scanner, processors for determining whether the bar code symbol has been damaged, and a decoder. The scanner initially scans the bar code to determine the symbology that governs the bar code. Once the symbology has been obtained, an expected length for each symbol can be calculated. The scanner then individually scans each symbol and compares the symbol's length to its expected length. If the lengths differ by a significant amount, the symbol is assumed to be damaged and information about the elements of each symbol are stored in memory. The scanner then scans in a reverse direction and stores information about the symbol in memory. A processor then determines all of the possible permutations of element widths from the stored information. Each permutation is checked against all possible decoded symbols until a single, decodable symbol is found.

22 Claims, 2 Drawing Sheets

BAR CODE READING SYSTEM FOR RECONSTRUCTING IRREGULARLY DAMAGED BAR CODES

BACKGROUND OF THE INVENTION

1. Field of the Invention

The present invention relates to a bar code reading system for reconstructing bar codes that have been damaged by wrinkles, crumples, creases, or by similar types of irregular damage. In particular, a scanner scans bar codes to determine whether symbols in the bar code are damaged. If the symbol is damaged, the reading system reconstructs the damaged symbol by calculating the possible permutations of black bar and white space elements to arrive at a single, decodable symbol.

2. Background

It is increasingly commonplace within industry to utilize bar code symbols printed on objects in order to identify the objects and convey information regarding the objects. A conventional bar code symbol comprises a pattern of vertical bars of various widths separated by spaces of various widths. The modulated widths of the bar and space elements can be interpreted by an electro-optical imaging system that converts the symbols into an electrical signal, which is then decoded to provide an alphanumeric representation of the bar code symbol. Bar code symbology of this nature are commonly used in various applications, such as inventory control, point of sale identification, or logistical tracking systems.

The electro-optical imaging system typically uses light from a light source that is scanned across the bar code field. Since the bar code symbology is often disposed on the object to be identified, it is desirable for the reader to be included in a hand-held or portable device so that the reader can be brought to the object. The operator can physically move the light source across the bar code field, such as by use of a light pen. Alternatively a bar code reader may include movable mirrors that automatically articulate light from a laser back and forth at a high rate to scan across the bar code field. The operator would normally be provided with a feedback signal, such as an audible tone, that alerts the operator as to the successful completion of a bar code reading operation.

Alternatively, electro-optical imaging systems can convert the entire bar code symbol into pixel information that is deciphered into the alphanumeric information represented by the symbol. Such imaging systems typically utilize charge-coupled device (CCD) technology to convert the optical information from the bar code symbol into an electrical signal representation of the symbol. CCD-based electro-optical imaging systems are preferable over laser-based imaging systems since the CCD does not require any moving elements, and is further adaptable to image advanced types of symbologies, such as two-dimensional codes, that could not be easily collected by an articulated laser. An image of the bar code symbol is optically transferred to a linear or two-dimensional array of multiple adjacent photodiodes that comprise the CCD device, with each one of the photodiodes defining a distinct picture element (or pixel) of the array. The CCD array is scanned electrically by activating the individual photodiodes in a sequential manner.

A successful bar code scan depends upon the clarity of the bar code symbol. A clean symbol can be scanned and decoded with little difficulty. A damaged bar code, however, poses problems for bar code scanners. When a bar code is wrinkled or crumpled, elements within a particular bar code symbol become displaced or hidden altogether. As a result, the bar code scanning operation may require several attempts before a successful scan is made, if a scan is even possible. Certain types of damage may render the bar code symbol completely unreadable by a conventional bar code reader.

Bar code symbol damage can be classified into two different types: regular damage and irregular damage. Regular damage can be defined as any kind of damage that merely obstructs the information encoded in the symbol but does not corrupt the flat surface of the bar code label. Examples of regular damage would include dirt, dust or grease that covers the bar code symbol. Regular damage can often be decoded by applying an alignment of partial successive scans.

Irregular damage obstructs the encoded information and corrupts the actual bar code label surface. The corruption of the surface can be described as a non-linear transformation of the bar-code surface. Examples of irregular damage are wrinkles, crumples, creases, and the like.

Irregular damage to bar codes on items slated for inventory or sale can economically harm a business that relies upon a bar code system. Particularly, damaged bar codes often cannot be read by a conventional bar code reader. The inability of the bar code reader to successfully read the damaged bar code results in the manual input of the information sought to be stored. The likelihood of error increases when significant amounts of encoded information must be input by hand. In addition, repeated manual input of information can lead to serious productivity losses and, consequently, lost profit for businesses that utilize bar code readers.

Moreover, more deleterious consequences can occur. For instance, a bar code reader can misread the damaged symbol and, in turn, input incorrect information. That error can be compounded when large quantities of a particular item are sold or inventoried based upon a single misread bar code. Once again, productivity losses occur once the error has been found and the correct information must be input by hand.

For the foregoing reasons, there is a need for a bar code reading system capable of reading irregularly damaged bar codes. More particularly, there is a need for a bar code reading system that can reconstruct a bar code symbol that has been damaged by wrinkles, crumples, creases, or the like.

SUMMARY OF THE INVENTION

The present invention is directed to a device that satisfies the need for a bar code reading system capable of reconstructing symbols in a bar code that have been irregularly damaged by wrinkles, crumples, or creases.

In a preferred embodiment, the bar code reading system of the present invention reads bar codes having at least one symbol, each symbol having a combination of black bars and white spaces of varying widths. The reader employs an input device that is capable of scanning or sampling a bar code in at least two directions. During an initial scan, a processor determines the type of symbology by reading the start and stop symbols of the bar code. From the symbology information, the processor can determine the X-dimension for each symbol, an expected length for each symbol, and the number of symbols in the bar code. The scanner then begins scanning or sampling, from a first direction, each symbol in the bar code, beginning with the first symbol. The length of the bar code symbol is compared to the expected length of the symbol. The symbol is acceptable for decoding if the difference between the expected length and the actual length fall within a predetermined toleration value. If the symbol cannot be decoded, a sequence of widths of each element in the symbol is constructed. From there, the bar code is scanned or sampled from the opposite side and on a different scan/sampling line. Each symbol is decoded up to the damaged bar code symbol and a reverse sequence of widths of each element in the damaged symbol is constructed. A set is then provided having all possible combinations of elements from the determined sequences of elements. If only one possible symbol exists in that set, that symbol is decoded. If no symbols or more than one symbol exist in that set, the symbol is re-scanned on a different sampling line. The process of re-scanning is repeated until the intersection of the set contains a single, decodable symbol.

A more complete understanding of the bar code reading system will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

Figure 1:
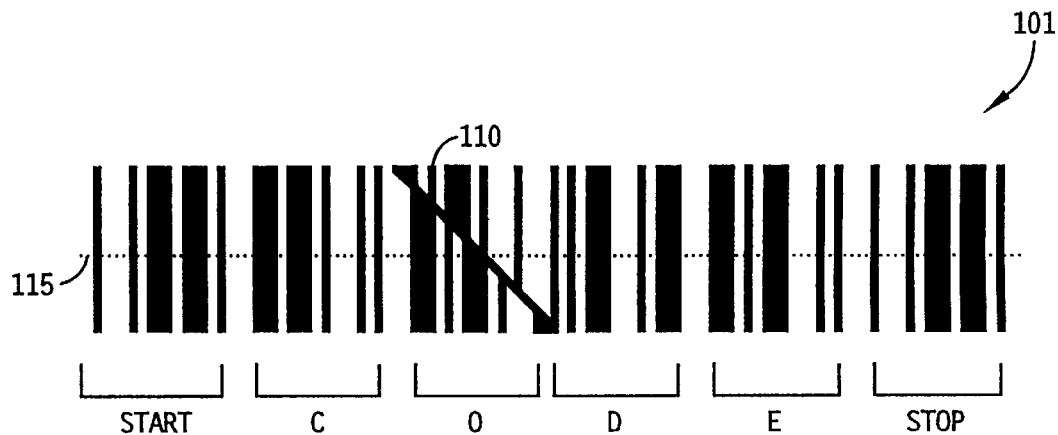
FIG. 1 is a representation of a bar code damaged by a wrinkle.

FIG. 1 shows an example of a damaged bar code 101 having four symbols representing the characters "C", "O", "D", and "E", as well as a start symbol and a stop symbol at the beginning and end of the bar code, respectively. A crease 10 traverses the symbol representing the "O" character. Throughout this detailed description, we assume that only the crease 110 exists, although the reading system of the present invention is capable of reading and decoding bar codes having numerous creases and other irregular damage. In addition, the bar code 101 shown in FIG. 1 is meant to be demonstrative only and is not restricted to the rules of any particular symbology. Indeed, in the present invention, a bar code governed by any symbology may be used so long as that symbology can be determined by scanning the bar code or sampling a digitized image of the bar code.

It is assumed, however, that the bar code 101 belongs to a particular symbology. In that symbology, any character from the bar code alphabet, ALP, where ALP={alp$_j$}, is symbolized by a combination of black bars and/or white spaces. Each black bar or white space is termed an "element" and each black bar element and each white space element has a particular width b and w, respectively. If we let S$_j$ be a sequence of widths of black bars and white spaces of a symbol j from the alphabet ALP, then S$_j$ is determined as follows:

$$S_j = \{b_1^j, w_1^j, b_2^j, w_2^j, \ldots, b_n^j, w_n^j\} \quad (1)$$

The sum of black bar and white space element widths C for a symbol j can then be calculated by the following equation:

$$C = \sum_{i=1}^{n} (b_i^j + w_i^j) \quad (2)$$

For every symbol representing a character in the alphabet ALP, C is a constant value. Thus, if the symbology is known, the length of each symbol (i.e., an "expected length") in the bar code can be calculated.

When a prior art device attempts to scan the damaged bar code 101, the scanning line 115 passes horizontally across the bar code 101. The crease 110, however, shifts certain elements in the "O" symbol leftward. In addition, the elements of each character following the "O" character are similarly moved leftward. When the bar code 101 is scanned, the scanner of the prior art device expects each symbol to have the constant width C, where C is determined from Equation (2). Since the bar code is damaged, the width of each bar code symbol, from "O" until the end of the bar code, is seemingly altered. Consequently, the "O" symbol and the remaining "altered" bar code symbols cannot be read or decoded.

Figure 2:
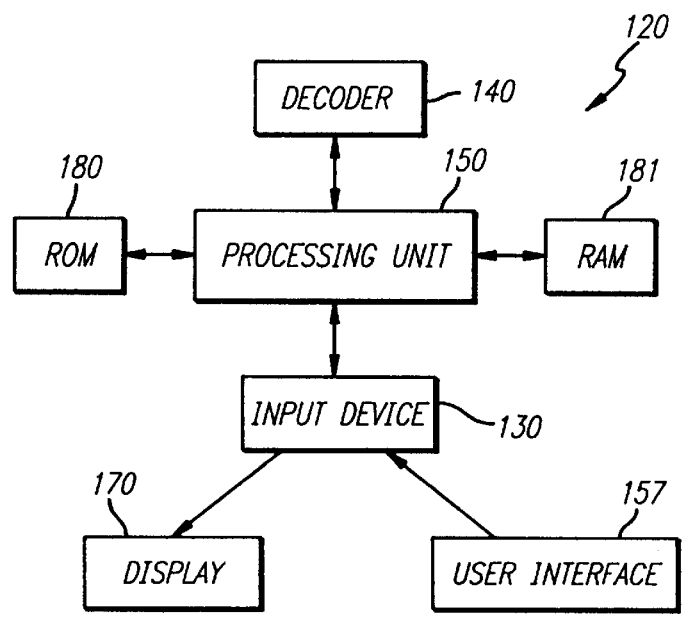
FIG. 2 is a block diagram of the reading system of the present invention.

The elements of a bar code reading system 120 are shown in FIG. 2. The reading system 120 includes an input device 130 such as a scanner or charge-coupled device, a processing unit 150, a display 170, a decoder 140, a user interface 157, permanent memory storage such as a read-only memory ("ROM") 180, and a temporary memory storage such as a random-access memory ("RAM") 181. Information or data that must be stored during execution of the instructions (as described below) is stored in addresses contained in RAM 181. Information or data that will be utilized during each scan or sample is permanently stored in ROM 180.

If a scanner is utilized as the input device 130, the scanner may be hand-held or fixed. In either case, the input device 130 should be a moving beam device capable of providing omnidirectional scanning. In other words, the scanner 130 can produce a series of straight or curved scanning lines of varying directions in the form of a starburst, a lissajous pattern, or other multiangle arrangement and project those lines at the bar code. For example, the Intermec Janus scanner is suitable for this purpose, although any similar omnidirectional scanner may also be utilized.

Alternatively, a CCD scanner may be used as the input device 130. If a CCD scanner is employed, the entire image of the bar code 101 is transferred. A digitized image of the bar code 101 is formed and each line of pixels in the digitized image is sampled as described herein. The terms "sample" and "scan", however, are used interchangeably throughout this discussion.

The display 170 may be a liquid crystal display, LED display, or video display terminal, although other display devices may be used. The display 170 is utilized to provide information to the user of the system. Display information usually includes information encoded in the symbol, results of a scan, and diagnostic and system information. The user interface 157 may be a keypad or other similar input device.

Figure 3:
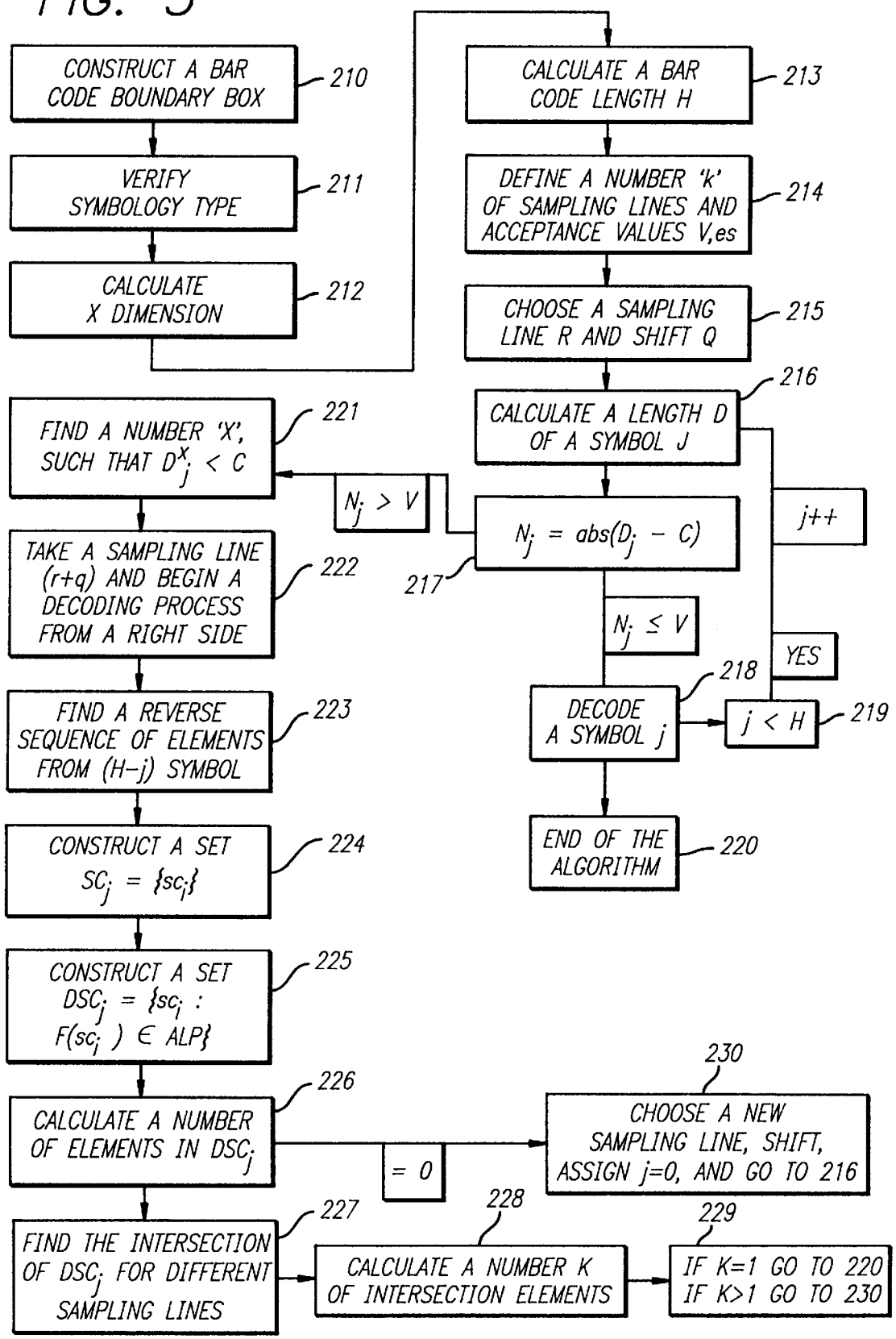
FIG. 3 is a flow chart diagramming the operation of the present invention.

The operation of the reading system will now be described. FIG. 3 shows a series of instructions that are executed by the processing unit 150. These instructions are stored in ROM 180. When the bar code 101 is scanned or an image of the bar code is sampled, the scanner 130 initially passes a scanning line (actually a continuous series of scanning spots) across the bar code 101. Alternatively, if a CCD scanner is used, an initial sample of the bar code 101 is taken. In a first step 210, when the scanning or sampling line passes over the bar code 101, a fictional rectangular "boundary box" is created around the bar code. The boundary box has fictional two-dimensional cartesian coordinates in x and y directions with respect to the flat surface of the bar code 101. These coordinates are stored in RAM 181 for later use.

Once the boundary box has been created, in step 211, the symbology that governs the bar code 101 is verified. In the reading system of the present invention, a bar code governed by any symbology may be used. Many different types of symbologies are known in the art, such as Universal Product Code ("UPC"), Codabar, and Code 128. The type of symbology can be determined by examining the start and stop symbols contained in the bar code 101. The terms "start symbol" and "stop symbol", as used herein, refer generally to beginning and end symbols that are typically used by most symbologies. For instance, the start and stop symbols of a UPC bar code are left and right guard patterns. The start and stop symbols in the bar code 101 are then compared with the numerous start/stop symbols of symbologies stored in ROM 180. Once a match has been found, the symbology type, along with information particular to that symbology, is stored in RAM 181.

If the symbology type of a bar code is known, many other characteristics of the bar code may later be determined. Thus, in addition to storing the symbology type in RAM 181, the processing unit stores an X-dimension value X, for that symbology in step 212. The X-dimension value is the nominal width dimension of the narrow bars and spaces in a bar code symbol and is constant for each symbology. In addition, for most symbologies, the number of symbol elements in each bar code is fixed. Both the X-dimension and the number of symbols in the bar code are stored in RAM 181.

From the X-dimension value, the boundary box coordinates, and the number of symbols in the bar code, the processing unit 150, in step 213, calculates a ratio H defining the number of symbols in the bar code 101, as follows:

$$H = \frac{dist}{X * n} \quad (3)$$

where dist is the length of the bar code, as determined from the boundary box coordinates, X is the X-dimension for the verified symbology, and n is the number of elements in each symbol for the verified symbology. The value H is then stored in RAM 181.

Figure 4:
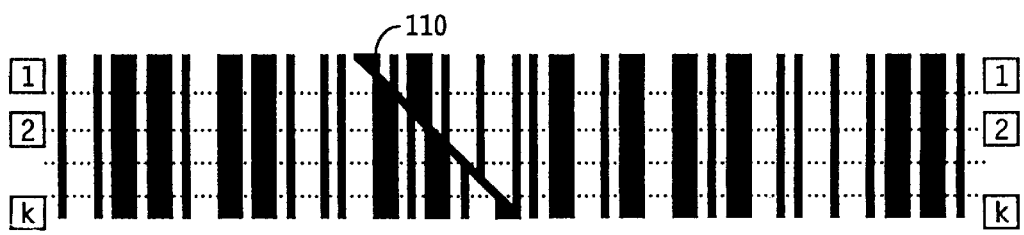
FIG. 4 is a representation of a bar code divided into plural scanning lines.

In step 214, the processing unit 150 next divides the bar code 101 into numerous scanning lines for an omnidirectional scanner or sampling lines for a CCD scanner. For purposes of this description, the number of scanning or sampling lines is equal to k, where k is a predetermined number that depends upon the height of the boundary box. FIG. 4 illustrates how the bar code can be broken down into numerous scanning lines. The processing unit 150 stores the number k in RAM 181 for later use. In step 215, the actual scan line number r (usually 1) is chosen, and a predetermined scan shift q is read from ROM 180 into RAM 181. The scan shift determines the number of scanning lines to which the scanner 130 will shift during a subsequent scan, as determined below. For greater precision, q can be decreased to a lower value.

The actual decoding and reconstruction process of the bar code 101 then proceeds by analyzing each individual symbol within the bar code. The symbol to be decoded j is initialized to 1 and the reading system scans the jth symbol from the left, which is the start symbol. The scanner 130 passes a scanning line over the start symbol in a left-to-right direction. Each element of the bar code symbol is stored in RAM 181. In a next step 216, the processing unit 150 calculates a length D of 'n' pairs of black bars and white spaces, in accordance with Equation (1), where C, the expected length of the symbol, is replaced by D, the actual length of the symbol.

In step 217, the processing unit 150 then computes the absolute value of the difference between D and C. If the absolute value is less than a fixed tolerance value V the decoder attempts to decode the symbol. If the absolute value of the difference between D and C is greater than V, the symbol is assumed to be damaged, and an attempt is made to reconstruct the damaged symbol.

The acceptable tolerance V is a fixed value that is precoded into ROM 180, although the reader 130 can be designed such that V is determined during a scan by the user via the user interface 157 in step 214. In either event, V should be determined based upon numerous parameters, including the total number of elements in a symbol, the size of the X-dimension in pixels, and the angular distortion of the scanner 130.

As stated above, if the absolute value of the difference between D and C is less than the tolerance value V the decoder 140, in step 218, attempts to decode the symbol by applying the decoding function F(S$_j$), for the jth symbol, where:

$$F(S_j) \in \{alp_j\} \quad (4)$$

if S$_j$ is a legal combination of bars and spaces within the symbology as determined by the symbology verifier. If the decoding is successful, the character represented by the decoded symbol is stored in RAM 180. In step 219, the processing unit 150 then checks to determine whether j, the number for the decoded symbol, is less than H, the total number of symbols in the bar code as determined by Equation (3). If j is less than H, the processing unit 150 increments the value of j and repeats the decoding process by returning to step 216 and calculating the length D for the next symbol. If j equals H, the processing unit 150 assumes that the last symbol has been decoded and terminates the scan in step 220.

Assuming that the reading system has decoded all symbols up to a symbol u the reading system may eventually reach a point where the absolute value of the difference between D$_u$ and C is greater than the allowed tolerance value V. The processing unit 150 has calculated the sum D$_u$, as follows:

$$D_u = \sum_{i=1}^{n} (b_i^u + w_i^u) \quad (5)$$

As with C, D$_u$ includes pairs of black bars and white spaces within the symbol. Because the absolute value exceeds the toleration value, the reading system assumes that the symbol is damaged and begins the process to reconstruct the damaged symbol u.

The process of reconstructing the symbol begins when the processing unit 150 constructs the sequence S$_u$, as follows:

$$S_u = \{b_1^u, w_1^u, b_2^u, w_2^u, \ldots, b_n^u, w_n^u\} \quad (6)$$

In step 221, the processing unit 150 attempts to find undamaged elements within the symbol from the sequence S$_u$. For the first x pairs of elements of the symbol u, having the sum D$^x_u$ (as determined by Equation (2)), where D$^x_u$<C, the processing unit 150 assumes that those first x pairs of elements are undamaged. Accordingly, the microprocessor stores the first x pairs in RAM 181.

Having identified the symbol u as damaged, the scanner 130 is instructed, in step 222, to scan from the right side of the bar code. Scanning line 115 begins with the right-most symbol and scans across the bar code to the left. In addition, scanning takes place on a lower scanning line having a number (1+q), where q is the predetermined scan shift.

On the $1+q^{th}$ scanning line, the scanner 130 attempts to decode all symbols from the right side of the bar code until it reaches symbol number H-u (counting from the right side of the bar code), where H is the number of symbols in the entire bar code as determined from Equation (3). As before, the absolute value of the difference between D (for each symbol) and C is compared to the tolerance value.

Once the H-$u^{th}$ symbol is reached, the processing unit 150 creates a reverse sequence of elements from the right side of the symbol in step 223, as follows:

$$S_{H-u} = \{b_1^{H-u}, w_1^{H-u}, b_2^{H-u}, w_2^{H-u}, \ldots, b_n^{H-u}, b_n^{H-u}\} \quad (7)$$

This sequence is constructed in accordance with the previous assumption that non-damaged elements exist on the right side of the bar code symbol.

After constructing the sequence, $S_j$, the processing unit 150 constructs the set $SC_j$, in step 224, where:

$$SC_j = \{sc_i\}, j=1, \ldots, P \quad (8)$$

The set $SC_j$ consists of all possible combinations of elements from sequences obtained from Equations (6) and (7). The set includes the first y pairs of elements from Equation 6 and the last n-y pairs of elements from Equation 7, where $y \leq x$, and $$\sum_{i=1}^{y}(b_i^u + w_i^u) + \sum_{i=y+1}^{n}(b_i^{H-u} + w_i^{H-u}) = C \pm ae \quad (9)$$

The value ae is an acceptance error that indicates how close the sums calculated in Equation (9) should be to our constant width value, C, for each symbol. As with the tolerance value, V, the value ae can be placed into ROM 180 during construction of the reader or can be determined at run-time by the user via the user interface 157.

Next, in step 225, the processing unit 150 constructs the set $DSC_1$, containing all of the possible decodable combinations from the set $SC_1$. $DSC_1$ is constructed based upon the following equation:

$$DSC_1 = \{sc_1 : F(sc_i) \in ALP\} \quad (10)$$

This set includes all of the decodable combinations from the set $SC_1$. Thus, all undamaged elements from different sampling lines are fused to reconstruct the damaged symbol.

In step 226, the processing unit calculates the number of elements in the set $DSC_1$. If the set $DSC_1$ is the null set or if the set includes more than one element, the processing unit 150 assumes that the symbol u is undecodable based upon sampling lines 1 and 1+q. The process is then repeated by returning to step 216 and scanning the symbol from the left side and right sides for sampling lines r and r+q.

If the set $DSC_1$ has no elements, the processing unit 150 executes step 230. In step 230, a new sampling line r and shift q is chosen, j is initialized to zero, and the unit returns to step 216.

If the set $DSC_1$ includes more than one element, the processing unit 150 executes step 227 and attempts to find the intersection of DSj for various sampling lines. Thus, in step 228, the processing unit 150 calculates a number K equal to the number of intersection elements in the set. In step 229, the processing unit either terminates the scan if K=1 or goes to step 216 if K is greater than 1.

Having thus described a preferred embodiment of a reading system, it should be apparent to those skilled in the art that certain advantages of the within system have been achieved. It should also be appreciated that various modifications, adaptations, and alternative embodiments thereof may be made within the scope and spirit of the present invention. For example, a microprocessor has been illustrated, but it should be apparent that the inventive concepts described above would be equally applicable to a host computer, digital signal processor ("DSP"), application-specific integrated circuit ("ASIC"), or discrete logic circuits. The invention is further defined by the following claims.

What is claimed is:

1. A bar code reading system comprising:

scanning means for scanning, on a first scanning line and in a first direction, a bar code having at least one symbol, the at least one bar code symbol having at least one of a black bar element and a white space element, a sum of widths of the at least one black bar element and white space element being a constant value for each at least one symbol;

damage-determining means for determining whether the at least one bar code symbol is damaged or undamaged, said damage-determining means including means for estimating an expected length of said bar code symbol and comparing said expected length with the actual length of said bar code symbol;

reconstructing means for reconstructing the bar code symbol if the bar code symbol is damaged; and decoding means for decoding the reconstructed or undamaged bar code symbol.

2. The bar code reading system as recited in claim 1, further comprising:

memory means for storing data.

3. A bar code reading system comprising:

scanning means for scanning, on a first scanning line and in a first direction, a bar code having at least one symbol, the at least one bar code symbol having at least one of a black bar element and a white space element, a sum of widths of the at least one black bar element and white space element being a constant value for each at least one symbol;

damage-determining means for determining whether the at least one bar code symbol is damaged or undamaged;

reconstructing means for reconstructing the bar code symbol if the bar code symbol is damaged; and decoding means for decoding the reconstructed or undamaged bar code symbol;

wherein the damage-determining means further comprises:

symbology determining means for determining a symbology type of the bar code;

number-calculating means for calculating a number of symbols in the bar code;

length-calculating means for calculating a length of a symbol in the bar code; and comparing means for comparing an absolute value of a difference between the calculated length of the symbol and the constant value to a predetermined tolerance value.

4. The bar code reading system as recited in claim 3, wherein the predetermined tolerance value is provided by a user of the bar code reading system.

5. A bar code reading system comprising:

scanning means for scanning, on a first scanning line and in a first direction, a bar code having at least one symbol, the at least one bar code symbol having at least one of a black bar element and a white space element, a sum of widths of the at least one black bar element and white space element being a constant value for each at least one symbol;

damage-determining means for determining whether the at least one bar code symbol is damaged or undamaged;

reconstructing means for reconstructing the bar code symbol if the bar code symbol is damaged; and decoding means for decoding the reconstructed or undamaged bar code symbol;

wherein the reconstructing means comprises:

scanning means for scanning, in a second direction, and on a second scanning line, the bar code;

sequencing means for calculating a first sequence comprising all element widths of the bar code symbol in the first direction, and a second sequence comprising all element widths of the bar code symbol in the second direction;

set calculating means for calculating a first set comprising all possible combinations of elements from the first sequence and the second sequence; and decode set calculating means for calculating a set comprising all decodable combinations from the first set.

6. The bar code reading system as recited in claim 1, wherein the scanning means comprises a hand-held, moving beam scanner.

7. The bar code reading system as recited in claim 1, wherein the scanning means comprises a fixed-mount, moving beam scanner.

8. The bar code reading system as recited in claim 1, wherein the scanning means comprises a charge-coupled device scanner.

9. The bar code reading system as recited in claim 1, wherein the decoding means comprises an on-line decoder.

10. The bar code reading system as recited in claim 1, wherein the decoding means comprises a portable decoder.

11. The bar code reading system as recited in claim 2, wherein the memory means further comprises at least one of a random-access memory and a read-only memory.

12. The bar code reading system as recited in claim 1, further comprising:

a host computer;

a display device coupled to the host computer; and a user interface coupled to the host computer.

13. A bar code reading system for reading bar codes having at least one symbol, the at least one bar code symbol having at least one of a black bar element and a white space element, a sum of widths of the at least one of a black bar element and a white space element being a constant value for each at least one symbol, the bar code reading system comprising;

damage-determining means for determining whether the at least one bar code symbol is damaged or undamaged;

reconstructing means for reconstructing the bar code symbol if the bar code symbol is damaged, said reconstructing means including a scanning means for scanning said bar code symbol in a first and second direction, and a set calculating means for calculating all possible decodable combinations in the bar code symbol;

decoding means for decoding the reconstructed or undamaged bar code symbol; and memory means for storing data.

14. A bar code reading system for reading bar codes having at least one symbol, the at least one bar code symbol having at least one of a black bar element and a white space element, a sum of widths of the at least one of a black bar element and a white space element being a constant value for each at least one symbol, the bar code reading system comprising;

damage-determining means for determining whether the at least one bar code symbol is damaged or undamaged;

reconstructing means for reconstructing the bar code symbol if the bar code symbol is damaged;

decoding means for decoding the reconstructed or undamaged bar code symbol; and memory means for storing data;

wherein the damage-determining means further comprises:

symbology determining means for determining a symbology of the bar code;

number-calculating means for calculating a number of symbols in the bar code;

length-calculating means for calculating a length of a symbol in the bar code; and comparing means for comparing an absolute value of a difference between the calculated length of the symbol and the constant value to a predetermined tolerance value.

15. A bar code reading system for reading bar codes having at least one symbol, the at least one bar code symbol having at least one of a black bar element and a white space element, a sum of widths of the at least one of a black bar element and a white space element being a constant value for each at least one symbol, the bar code reading system comprising;

damage-determining means for determining whether the at least one bar code symbol is damaged or undamaged;

reconstructing means for reconstructing the bar code symbol if the bar code symbol is damaged;

decoding means for decoding the reconstructed or undamaged bar code symbol; and memory means for storing data;

wherein the reconstruction means comprises:

sequencing means for calculating a first sequence comprising all element widths of the bar code symbol in a first direction, and a second sequence comprising all element widths of the bar code symbol in a second direction opposite the first direction;

set calculating means for calculating a first set comprising all possible combinations of elements from the first sequence and the second sequence; and decode set calculating means for calculating a set comprising all decodable combinations from the first set.

16. The bar code reading system as recited in claim 13 further comprising a moving-beam scanner.

17. The bar code reading system as recited in claim 13, wherein the decoding means is a decoder.

18. A method for reading bar codes comprising the steps of:

scanning, on a first scanning line and in a first direction, a bar code having at least one symbol, the at least one bar code symbol having at least one of a black bar element and a white space element, a sum of widths of the at least one of a black bar element and a white space element being a constant value for each at least one symbol;

determining whether the at least one bar code symbol is damaged or undamaged, including the steps of estimating an expected length of said bar code symbol and comparing said expected length with the actual length of said bar code symbol;

reconstructing the bar code symbol if the bar code symbol is damaged, including the steps of scanning the bar code symbol in a second direction and calculating a set of all possible decodable combinations of the bar code symbol; and decoding the reconstructed or undamaged bar code symbol.

19. A method for reading bar codes comprising the steps of:

scanning, on a first scanning line and in a first direction, a bar code having at least one symbol, the at least one bar code symbol having at least one of a black bar element and a white space element, a sum of widths of the at least one of a black bar element and a white space element being a constant value for each at least one symbol;

determining whether the at least one bar code symbol is damaged or undamaged;

reconstructing the bar code symbol if the bar code symbol is damaged; and decoding the reconstructed or undamaged bar code symbol;

wherein the determining step further comprises the steps of:

determining a symbology of the bar code;
calculating a number of symbols in the bar code;
calculating a length of a symbol in the bar code; and
comparing an absolute value of a difference between the calculated length of the symbol and the constant value to a predetermined tolerance value.

20. A method for reading bar codes comprising the steps of:

scanning, on a first scanning line and in a first direction, a bar code having at least one symbol, the at least one bar code symbol having at least one of a black bar element and a white space element, a sum of widths of the at least one of a black bar element and a white space element being a constant value for each at least one symbol;

determining whether the at least one bar code symbol is damaged or undamaged;

reconstructing the bar code symbol if the bar code symbol is damaged; and decoding the reconstructed or undamaged bar code symbol;

wherein the reconstructing step further comprises the steps of:

scanning, in a second direction, and on a second scanning line, the bar code;

calculating a first sequence comprising all element widths of the bar code symbol in the first direction, and a second sequence comprising all element widths of the bar code symbol in the second direction;

calculating a first set comprising all possible combinations of elements from the first sequence and the second sequence; and calculating a set comprising all decodable combinations from the first set.

21. An apparatus for decoding a bar code symbol having a plurality of data elements, said apparatus comprising:

a processor;

an input device coupled to said processor for creating a digitized image of said bar code symbol;

a program memory storing a program for controlling said processor to reconstruct a damaged data element within said bar code symbol by scanning said damaged data element in a first and second direction, calculating a set of all possible decodable combinations of said damaged data element, and repeating said scanning and calculating on different scan lines until said set includes only one decodable data element; and a decoder for decoding said digitized image.

22. An apparatus for decoding a bar code symbol having a plurality of data elements, said apparatus comprising:

a processor;

an input device coupled to said processor for creating a digitized image of said bar code label;

a program memory storing a program for controlling said processor to detect damage in one of said plurality of data elements by comparing an expected length of said data element to a scanned length of said data element, and reconstruct a damaged data element within said bar code symbol by scanning said damaged data element in a first and second direction, calculating a set of all possible decodable combinations of said damaged data element, and repeating said scanning and calculating on different scan lines until said set includes only one decodable data element; and a decoder for decoding said digitized image.

* * * * *